US007124108B1

(12) United States Patent
Kimle et al.

(10) Patent No.: US 7,124,108 B1
(45) Date of Patent: Oct. 17, 2006

(54) METHOD FOR ELECTRONICALLY INITIATING AND MANAGING AGRICULTURAL PRODUCTION CONTRACTS

(76) Inventors: Kevin L. Kimle, 3222 Lettie St., Ames, IA (US) 50010; David R. Krog, 546 Waterbury Cir., Des Moines, IA (US) 50312; John E. Stucki, 5663 Vista Dr., West Des Moines, IA (US) 50266; Alan G. Schmitz, 1009 NE. 5th St., Ankeny, IA (US) 50021; Reynold R. Harder, 502 Ely Cir., Ames, IA (US) 50010

( * ) Notice: Subject to any disclaimer, the term of this patent is extended or adjusted under 35 U.S.C. 154(b) by 0 days.

(21) Appl. No.: 09/335,648

(22) Filed: Jun. 18, 1999

Related U.S. Application Data

(60) Provisional application No. 60/090,198, filed on Jun. 22, 1998.

(51) Int. Cl.
*G06F 17/60* (2006.01)
(52) U.S. Cl. .......................................... 705/37; 705/35
(58) Field of Classification Search ................... 705/37, 705/35
See application file for complete search history.

(56) References Cited

U.S. PATENT DOCUMENTS

| | | | | |
|---|---|---|---|---|
| 4,903,201 A | * | 2/1990 | Wagner | 705/37 |
| 5,063,507 A | * | 11/1991 | Lindsey et al. | 364/408 |
| 5,101,353 A | * | 3/1992 | Lupien et al. | 705/37 |
| 5,113,643 A | * | 5/1992 | Peterson et al. | 56/153 |
| 5,285,383 A | * | 2/1994 | Lindsey et al. | 705/26 |
| 5,678,041 A | * | 10/1997 | Baker et al. | 395/609 |
| 5,701,451 A | * | 12/1997 | Rogers et al. | 395/600 |
| 5,706,502 A | * | 1/1998 | Foley et al. | 395/610 |
| 5,794,207 A | * | 8/1998 | Walker et al. | 705/23 |
| 5,924,082 A | * | 7/1999 | Silverman et al. | 705/37 |
| 5,924,083 A | * | 7/1999 | Silverman et al. | 705/37 |
| 5,963,952 A | * | 10/1999 | Smith | 707/102 |
| 6,044,356 A | * | 3/2000 | Murthy et al. | 705/8 |
| 6,161,099 A | * | 12/2000 | Harrington et al. | 705/37 |
| 6,871,191 B1 | * | 3/2005 | Kinney et al. | 705/37 |
| 6,988,083 B1 | * | 1/2006 | Dines et al. | 705/37 |

(Continued)

FOREIGN PATENT DOCUMENTS

JP 02001243556 A * 9/2001

OTHER PUBLICATIONS

Commodity Trading Manual, Chicago Board of Trade, 1994, pp. 35-46, 193-219, 315, 324, 350.*

(Continued)

*Primary Examiner*—Charles R. Kyle
(74) *Attorney, Agent, or Firm*—McKee, Voorhees & Sease, P.L.C.

(57) ABSTRACT

A method of facilitating the contracting of agricultural products using the Internet is used for providing buyers and sellers with real time information relating to the type and amount of agricultural products available for contract. The invention includes a relational database for the storage and retrieval of information. One or more end use buyers can store information in the database relating to a desired type and quantity of agricultural products. Agricultural producers, such as farmers, can view listings of agricultural products desired and the system can facilitate the contracting between the buyers and producers for the agricultural products. The system can display in real time the quantity and types of agricultural products under contract and available for contract. The system can manage delivery preferences, quality data and determine contract pricing based on these criteria.

38 Claims, 27 Drawing Sheets

U.S. PATENT DOCUMENTS

2002/0016759 A1* 2/2002 Macready et al. ............ 705/37

OTHER PUBLICATIONS

Microsoft Press Computer Dictionary, Third Edition, Microsoft Press, 1997, p. 268.*

Developing Client/Server Applications with Oracle Developer/2000, Sam Publishing, 1996, pp. 74, 92, 102.*

J. Downes and J. E. Goodman, Dictionary of Fiannce and Investment Terms, Fifth Edition 1998, p. 106.*

* cited by examiner

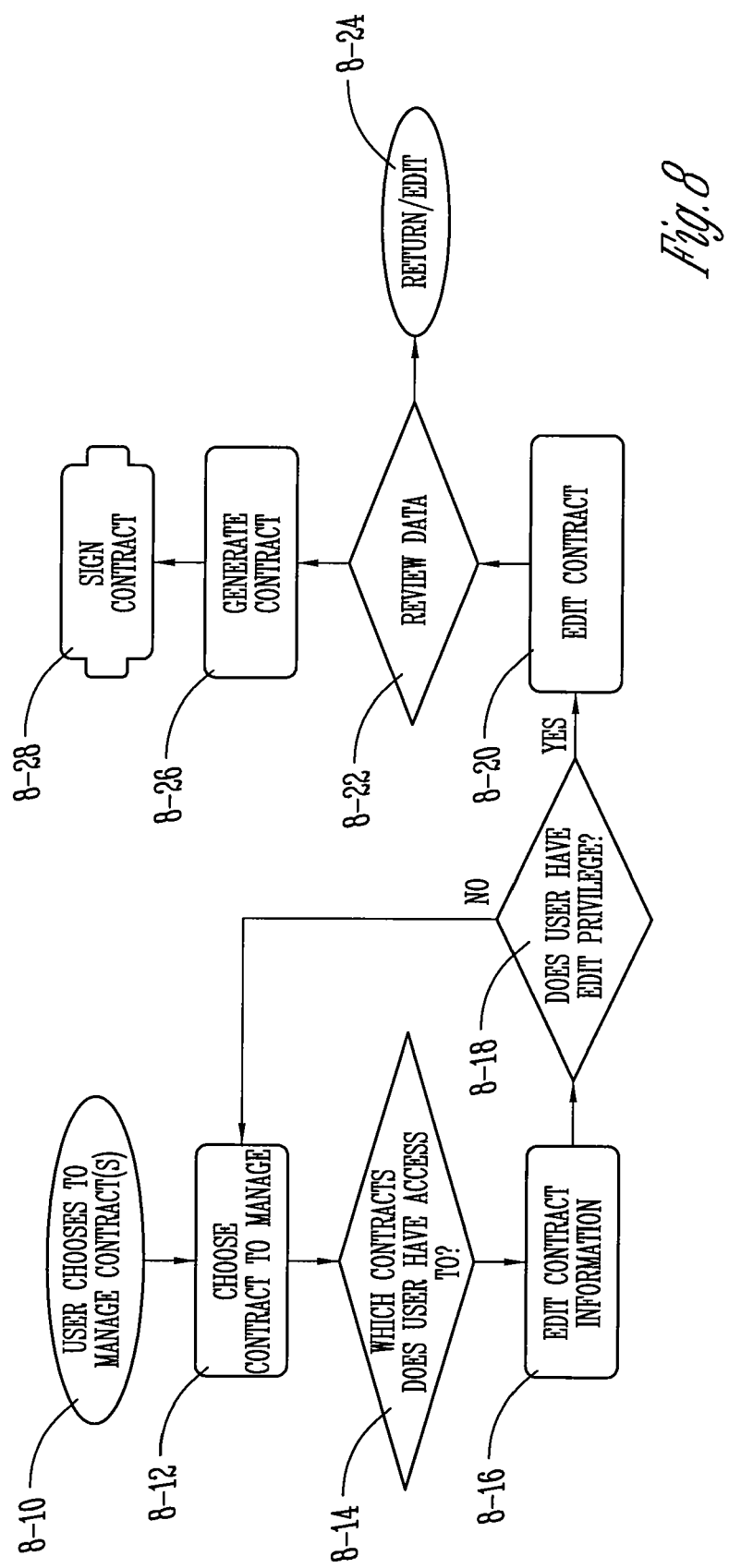

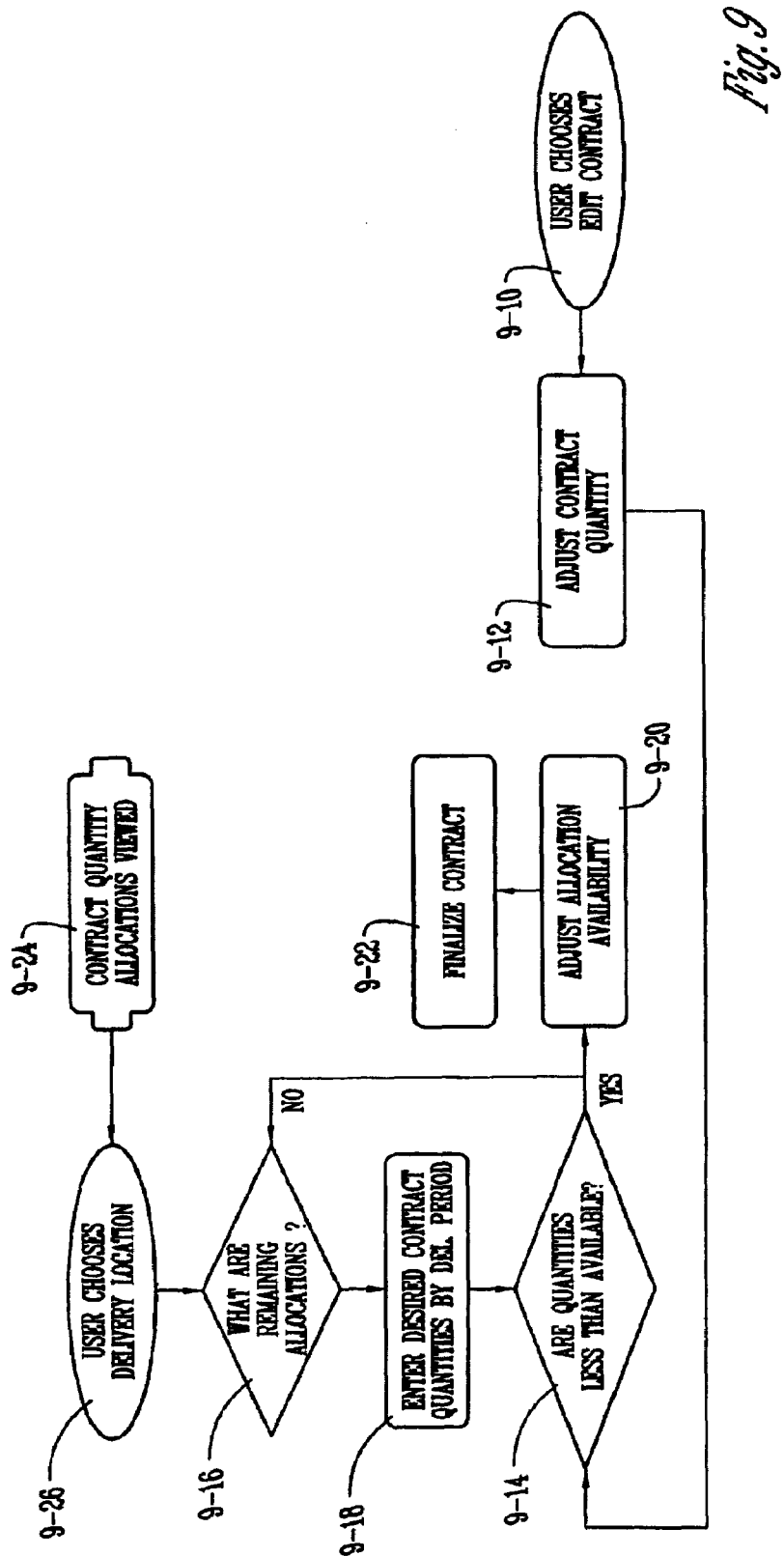

Fig. 10

| BACK | FWD | RELOAD | HOME | SEARCH | PRINT | STOP |

URL

THE COMPANY    CONTACT    SEARCH    ◄▬MARKETS    AgriBusiness Center

◄▬MARKETS
Connecting Agribusiness
and the Food industry

Login    Tuesday June 15

NetMarket

NetMarket information, online tour, and registration

E-Markets announces NetMarket launch

Agribusiness & Food 50 Stocks

Stock Quotes

| Sector | % Change |
|---|---|
| Agricultural Inputs | 0.2% |
| Agricultural Processing | 0.86% |
| Food Products | 0.34% |
| Food Services | 0.08% |
| Food Retail | 1.54% |

News from Around the Net

Tuesday June 15:
Ukraine is becoming major wheat exporter
EU looks at livestock feed
FDA detains European egg products and animal feed
Kroger has no comment on Safeway acquisition talk
Asians eating better than ever Monday June 14:
Spanish grain shippers say hard to segregate GM foods
Farm groups appeal for $6 billion to $8 billion in aid
EU farm minister to debate Belgian dioxin scare
American white wheat producers vote to reorganize
Value-added co-ops help farmers capture greater margins Friday June 11:
U.S. warns EU of risk of GM trade war
Pork producers talk of cooperative plant
Monarch butterfly researchers urge caution
Ralston Purina to shed Eveready battery unit
LPD change could cost $400 million

Fig. 11

NetContract

Help    Main Menu    ← - Menu    LogOut

Contract Management System

Please select one of the options below:

↑ Make New Contract
↑ Manage Existing Contract
↑ Delivery Management
↑ Administration
↑ View Reports and Information
↑ Variety Data

[E-Menu]

Fig. 12

NetContract  Help  Main Menu  – Menu  LogOut

Querying the Database....

Available Opportunities

| Elevator | City | State | Zip | Phone | Distance |
|---|---|---|---|---|---|
| Demo Feed and Grain | Demo | AS | 50010 | (555) 555-1212 | 0 Miles |
| Program Type | | | | Contract Type | Available |
| Demo – Buyers Call | | | | Buyers Call | 491 Acres |

| Elevator | City | State | Zip | Phone | Distance |
|---|---|---|---|---|---|
| West Central Coopera | Boone | IA | 50036 | (515) 432-4563 | 13 Miles |
| Program Type | | | | Contract Type | Available |
| Hi Oil Corn | | | | Buyers Call | 0 Acres |

| Elevator | City | State | Zip | Phone | Distance |
|---|---|---|---|---|---|
| Buckeye Coon | Buckeye | IA | 50043 | (515) 855-4141 | 30 Miles |

BACK FWD RELOAD HOME SEARCH PRINT STOP

URL

◀-MARKETS NetContract    Help    Main Menu    ◀ - Menu    LogOut

Enter Acres for B&W Coop, Breckenridge MI

| Window Name | Window Start Date | Window End Date | Available Acres | Selected Acres |
|---|---|---|---|---|
| Oct.-March | October 01, 1999 | March 31, 2000 | 1600 | |

Enter these windows

Cancel Contract

```
[BACK] [FWD] [RELOAD] [HOME] [SEARCH] [PRINT] [STOP]
URL [_____]

E-MARKETS  NetContract        Help    Main Menu  ← - Menu   LogOut

[Another Sample Contract]  [Reports Menu]

SAMPLE SAMPLE SAMPLE SAMPLE SAMPLE
                         Grains, L.L.C.
                 Buyer's Call Agreement to Grow  Corn THIS AGREEMENT is made this ____ day of _____, 1998 between _____ (hereinafter "GROWER") and Grains, L.L.C.
(hereinafter ____), relates to the production and delivery of hybrid corn grain.....
```

Fig. 20

| BACK | FWD | RELOAD | HOME | SEARCH | PRINT | STOP |

URL

E-MARKETS NetContract   Help   Main Menu   ◀ – Menu   LogOut

Contract Summary

| Contract Number | 199910848 |
| --- | --- |
| Phase | Authorized |
| Originator | Chandra J. Herrstrom, E-Markets Inc. Ames IA, (515)233-8720 |
| Program | No program chosen—No delivery type chosen |
| Grower | No grower selected |
| Elevator | No elevator selected |
| Seed Companies | No seed company selected |
| Units | No Units chosen |
| Pending Date | NO |
| Signed | NO |
| On File | NO |

Disable this Contract

Done

Fig. 24

BACK | FWD | RELOAD | HOME | SEARCH | PRINT | STOP

URL i-MARKETS  NetContract    Help   Main Menu   ← - Menu   LogOut

Select elevator to manage.

A-Way Inc -- Crescent City, IL
ADM Countrymark -- Silver Grove, KY
Ag Mark -- Washington, IA
Ag One Coop -- Markleville, IN
Ag Partners -- Goodhue, MN
AGP Grain-Buffalo Center -- Buffalo Center, IA
AGP/Cenex -- Wasau, NE
Agripride FS/CGC-East St. -- Addieville, IL
Akron Services -- Edelstein, IL
Akron Services/CGC-Lacon -- Lacon, IL Continue    Delivery Mgmt Menu

Fig. 25

NetContract

Delivery Management for High Sucrose A232HS Soybean at AGP/Centex.

| Grower Name (County Trend Yeild) (Estimated Yeild) | Contract Number | Delivery Window | Number Contracted | Est. Production (Bushels) | Delivered Bushels (Cumulative) | Delivery Complete |
|---|---|---|---|---|---|---|
| Troy Anderson (47) [47] | 9807909 | 1998-09-01– 1999-03-31 | 65 Acres | 3055 | 0 | ☐ |
| Conrad Frevert (46) [46] | 9807902 | 1998-09-01– 1999-03-31 | 110 Acres | 5060 | 0 | ☐ |
| Gary Graham (44) [44] | 9807905 | 1998-09-01– 1999-03-31 | 55 Acres | 2420 | 0 | ☐ |

Fig. 27

Security Admin Functions

↑ Make a new security group
↑ Modify a users security group membership
↑ Modify security group privileges
↑ Modify security group(s) privileges - alternate method
↑ Add special security privileges to a user
↑ Report users in a select group

[Return]

◀ - Menu

METHOD FOR ELECTRONICALLY INITIATING AND MANAGING AGRICULTURAL PRODUCTION CONTRACTS

This application is based upon Applicants' provisional application Ser. No. 60/090,198 filed on Jun. 22, 1998, entitled METHOD FOR ELECTRONICALLY INITIATING AND MANAGING AGRICULTURAL PRODUCTION CONTRACTS.

BACKGROUND OF THE INVENTION

1. Field of the Invention

The present invention relates to contracting between producers (such as farmers) and grain elevators, processors and end-use buyers (such as food companies). More particularly, though not exclusively, the present invention relates to method for electronically initiating and managing agricultural production contracts.

2. Problems in the Art

Typically, end-use buyers (for example, food processing companies) have contracted with grain producers to grow agricultural products (for example, high-oil corn varieties or other crops), often using seed from a number of seed firms. However, most forward contracting between end-use buyers and individual grain producers is labor-intensive and expensive.

At least one automated prior art system exists in the cotton trading industry. U.S. Pat. Nos. 5,063,507 and 5,285,383 describe commodity trading systems having a centralized computer database including title information for bales of cotton. The systems are used for assigning and transferring title to the goods, and for assigning an electronic warehouse receipt to the goods. The essence of these prior art systems resides in electronic title for each bale of cotton. This is possible because cotton markets assign unique ownership and quality control information to each bale. However, the notion of "title" is irrelevant to the system of the present invention (described below).

Other prior art patents of interest include: U.S. Pat. No. 5,678,041, METHOD FOR RESTRICTING USER ASSESS RIGHTS ON THE INTERNET; U.S. Pat. No. 5,706,502, INTERNET-ENABLED PORTFOLIO MANAGER SYSTEM AND METHOD; and U.S. Pat. No. 5,701,451, METHOD FOR FULFILLING REQUESTS OF A WEB BROWSER.

Above mentioned U.S. Pat. Nos. 5,063,507, 5,285,383, 5,678,041, 5,706,502 and 5,701,451 are incorporated by reference herein.

Features of the Invention

A general feature of the present invention is the provision of a method for electronically initiating and managing agricultural production contracts which overcomes problems found in the prior art.

A further feature of the present invention is the provision of a method for electronically initiating and managing agricultural production contracts using the Internet and commercially-available Internet Web browsers and Internet Web servers.

A further feature of the present invention is the provision of a method for electronically initiating and managing agricultural production contracts which allows parties to enter and view information relating to the contracts.

Further features, objects, and advantages of the present invention include:

A method for electronically initiating and managing agricultural production contracts which allows commodity suppliers to search for contract or program opportunities in a database that contains lists of contract types, end-buyers, crop varieties wanted or geographical locations of delivery including by zip code, county or other geographical descriptors.

A method for electronically initiating and managing agricultural production contracts which provides electronic allocation of target production quantities that are subsequently reduced as production contracts are completed.

A method for electronically initiating and managing agricultural production contracts in which delivery dates and methods from supplier to intermediary or end-buyer are electronically initiated and managed.

A method for electronically initiating and managing agricultural production contracts which allows contract parties to specify a contract as "pending" prior to a definite program market starting date at which time it will become legally binding.

A method for electronically initiating and managing agricultural production contracts in which quality measures of contracted and delivered product, determined by sampling and testing of lots either growing in the field or delivered, may be electronically entered and managed by suppliers, elevators or end-use buyers.

A method for electronically initiating and managing agricultural production contracts in which the price paid to the supplier is determined by measures of product quality or the delivery time and method which are agreed upon and entered electronically into the database.

A method for electronically initiating and managing agricultural products may be electronically contracted, including corn, soybeans, canola, sunflowers, wheat, cotton, beef, pork, poultry, fish, fruits, vegetables, honey, beets, horticultural varieties and other crops. For purposes herein, the terms agricultural commodities or agricultural products are intended to be broad and include plants, animals, or other products produced by persons or entities in the agribusiness and food industry.

A method for electronically initiating and managing agricultural production contracts which uses software-level security for accessing various parts of the contracting program application and databases.

A method for electronically initiating and managing agricultural production contracts which uses an RDMS (relational data base system) in conjunction with an Internet Web server.

These as well as other features, objects and advantages of the present invention will become apparent from the following specification and claims.

SUMMARY OF THE INVENTION

The method of the present invention is used by buyers and sellers to facilitate the contracting of agricultural commodities using a wide area distributed network or the Internet. In one form, the invention can be comprised of an Internet Web server and a centralized database system for the storage and retrieval of data. Data is stored on the database which relates to the types and amounts of agricultural commodities desired by one or more buyers. The system can display over the network or Internet a listing of desired commodities, including information related to the types and amounts of the commodities to a user. A commodity supplier can search this data remotely through various lists or tables including contract types, end-buyers, varieties of crop wanted or location of buyers or delivery points in order to discover programs of interest. A commodity supplier can, from a remote location, enter data into the system relating to a specific type and amount of commodity which the supplier is willing to supply to the buyer. The system is capable of generating a contract for the sale and delivery of the specific type and amount of commodity by the supplier to the buyer.

BRIEF DESCRIPTION OF THE DRAWINGS

FIGS. 7–9 are flowcharts illustrating the functionality of the present invention.

FIGS. 10–28 are views showing computer screen displays for the preferred embodiment of the present invention. Note that in FIGS. 10–28, the names of individuals and companies are either not shown or shown with generic names. The identification of companies and individuals is irrelevant to the understanding of the present invention.

DETAILED DESCRIPTION OF THE PREFERRED EMBODIMENT

Figure 1:
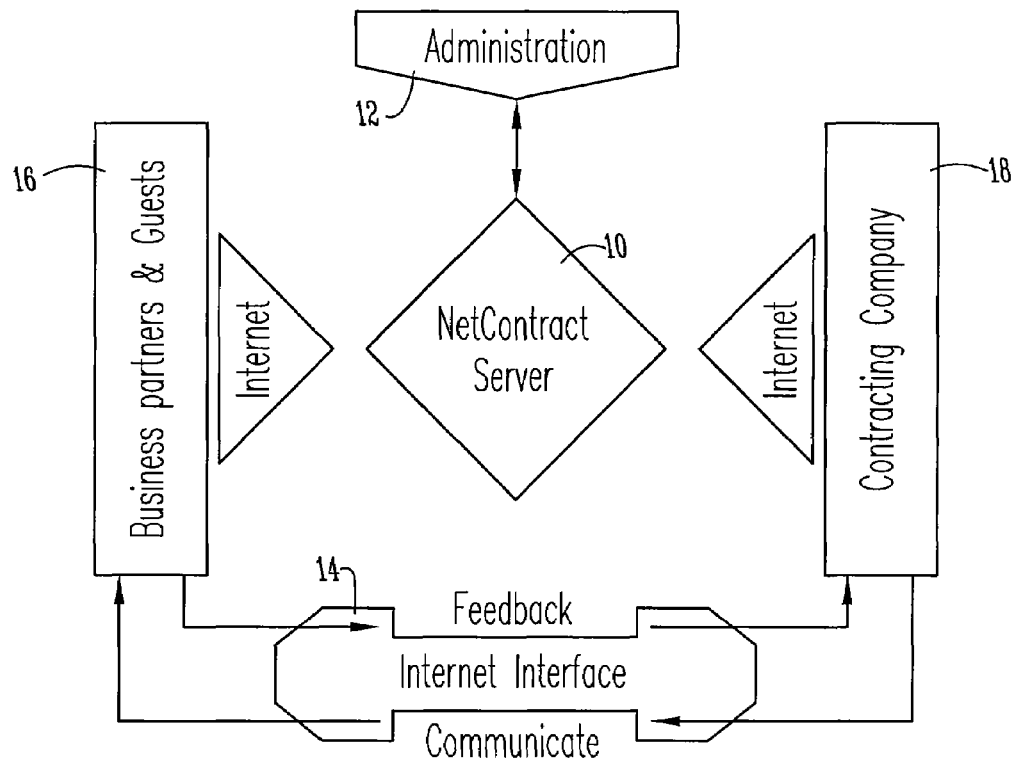
FIGS. 1–6 are network diagrams illustrating an overview of the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

While the system of the present invention has many applications, the preferred embodiment is used to facilitate contracting between end-use buyers (such as large manufacturers, processors, distributors or retailers of food or agricultural products) and agricultural producers (such as individual farmers, ranchers or growers.) In one example, an end-use buyer may be producing a product which requires a specialty crop such as corn with a high oil content. Various seed companies offer bio-engineered seed corn for growing high-oil corn. In order for the end-use buyer to ensure a supply of high-oil corn, the end-use buyer desires to contract with individual grain producers to grow high-oil corn. The system of the present invention provides the end-use buyer an efficient and effective mechanism for the end-use buyer to set up contracts with individual producers. The system of the present invention also allows individual farm producers to contract with a greater variety of buyers from a wider area and thereby to broaden their market access.

Initially, the end-use buyer must enter into the system a quantity and description of agricultural products desired. In one example, the buyer may desire X number of acres or bushels of high-oil corn and therefore enters that number of acres or bushels into the system. The buyer may also allocate the acres or bushels among a number of seed companies or a number of elevators, in order to ensure that the acres are spread across a market or geographical region. A seed corn seller can then meet with individual grain producers and provide a listing (via the Internet) of various agricultural products which are available with a guaranteed market. Alternately, the grain producers can view a similar listing without the aid of a seed seller.

The system will display the description and number of acres or bushels of each crop available in the producer's region. If the producer desires to enter into a contract for any of the available agricultural products, the system allows a user to enter into a contract over the Internet. The system will prompt the user to enter various information including the number of acres desired, the elevator used, the type of contract desired, dates and methods of delivery, etc. The system will determine whether the acres are in fact available for contract, as well as if the selected elevator is allocated enough acres to satisfy the request. The system will also determine whether the elevator or buyer is willing to accept the crop at the proposed delivery dates. Assuming everything checks out, the system can produce a contract to be signed by all of the appropriate parties, either manually or using digital signatures or other secure mechanisms to indicate a binding agreement. Included in this contract may be specific price premiums to be paid by the buyer to the seller if certain conditions of product quality or delivery date and method are met.

Using the present invention, the end-use buyer is able to use the Internet to access a Web server to view, in real time, information relating to the number of acres or bushels contracted, the number of acres or bushels available, who has contracted acres or bushels, where the acres or bushels have been contracted, the dates of delivery, the types of contracts, etc. With this information, the end-use buyer will know in advance where the products will come from and when the products will come. The end-use buyer is then able to set up the appropriate distribution and storage facilities well in advance of when they will be needed.

The present invention utilizes commonly available Internet browsers and Internet servers. FIGS. 1–6 are network diagrams illustrating the system of the present invention. FIG. 1 represents the Internet Web server 10, the Web server administration 12, the Internet interface 14, the business partners and guests 16, and the contracting company 18. The components of the system of the present invention shown in FIG. 1 are all functionally connected via the Internet. The components and inter-connection thereof are well-known in the art. The components shown in FIG. 1 are described in more detail below.

Figure 2:
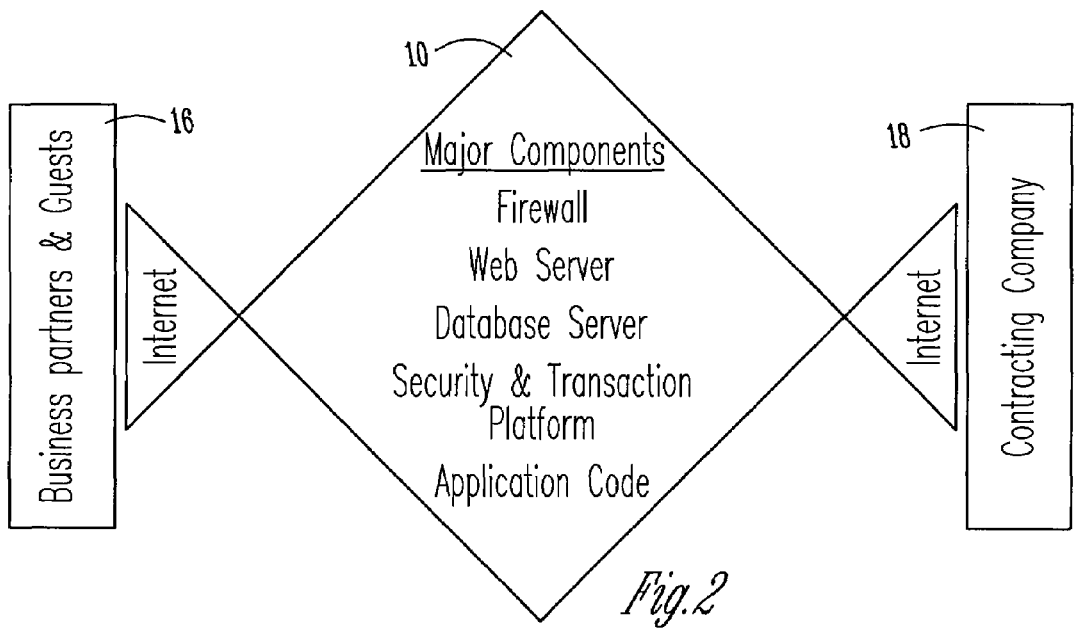

FIG. 2 is a network diagram emphasizing the Internet Web server 10 shown in FIG. 1. The major components of the Web server include a firewall, the Web server itself, a database server, a security and transaction platform, and the application code. The Internet Web server 10 is a secure Web server and uses a version of the STRONGHOLD Web server product from C2Net Communications Inc. The STRONGHOLD Web server is modified to include an integrated script interpreter for the PERL programming language. As shown, the Internet Web server 10 is connected (via the Internet) to the business partners and guests 16 as well as the contracting companies 18.

Figure 3:
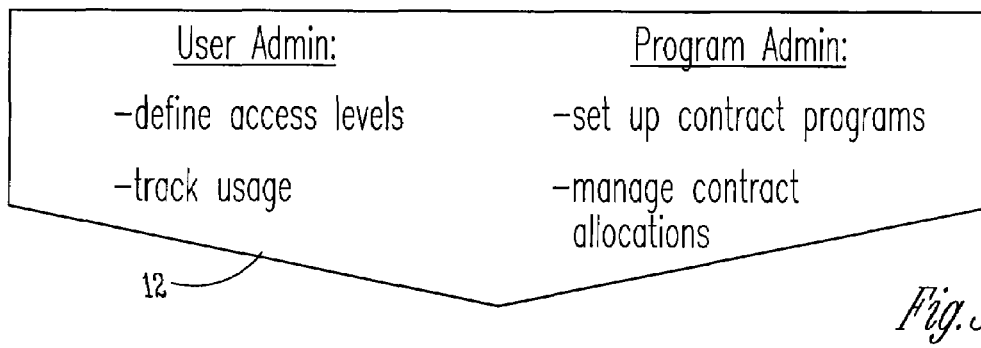

FIG. 3 is a network diagram emphasizing the user administration 12 shown in FIG. 1. The user administration system performs both user administration functions and program administration functions. The user administration functions include the definition of user access levels (security) and usage tracking. The program administration functions include the set up of contract programs and the management of contract allocations and deliveries.

Figure 4:
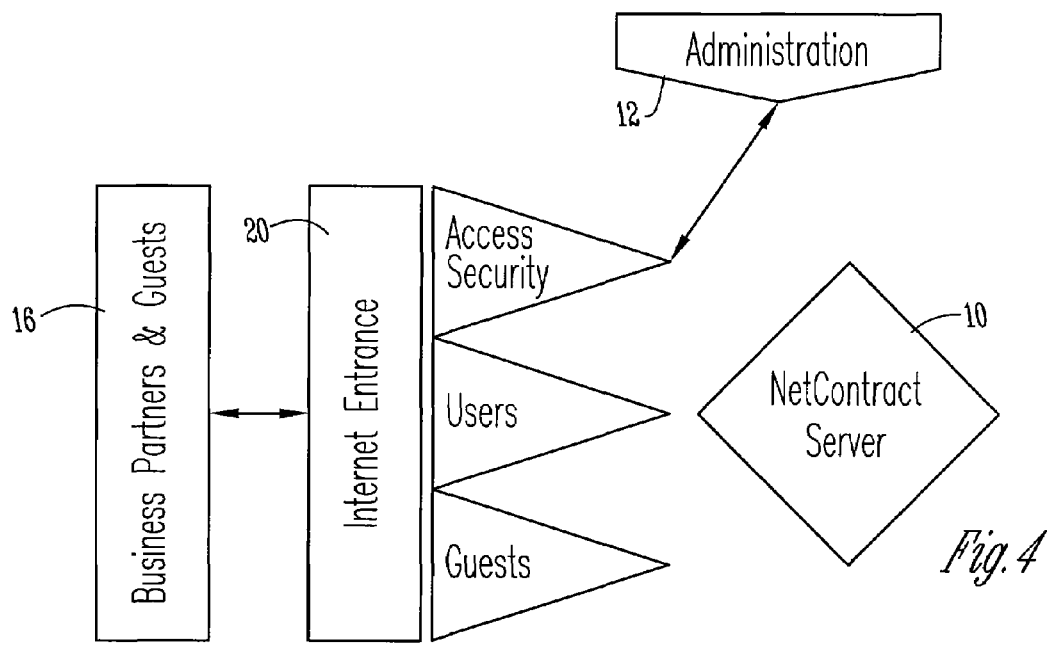

FIG. 4 is a network diagram emphasizing the access of the business partners and guests 16 shown in FIG. 1. As shown, the business partners and guests are connected to the Internet server 10 via an Internet entrance 20. As mentioned above, the Web server administration 12 defines the access levels in which users and guests are allowed to use.

Figure 5:
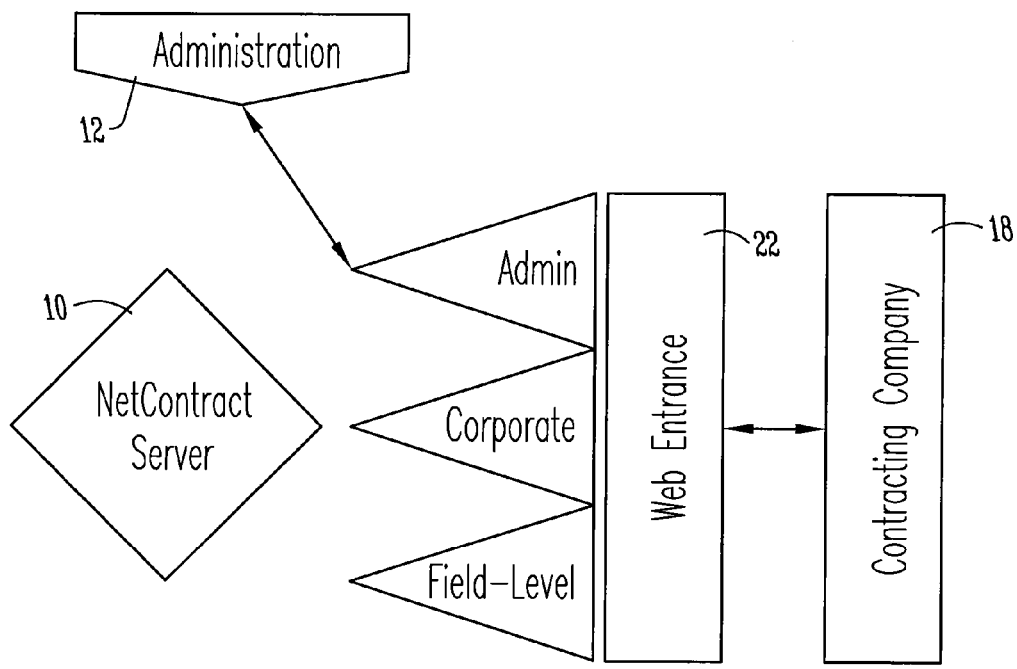

FIG. 5 is a network diagram emphasizing the access of the contracting companies 18 shown in FIG. 1. As shown, the contracting companies 18 are connected to the Internet server 10 via a Web entrance 22, similar to the Internet entrance 20 shown in FIG. 4.

Figure 6:

FIG. 6 is a network diagram emphasizing the Internet interface 14 shown in FIG. 1. The Internet interface 14 facilitates communication and feedback between the various components of the present invention. The Internet interface 14 facilitates communication relating to the creation of new contracts, the management of existing contracts, contract reports, data management, and logistics management.

The Web server 10 of the present invention uses a relational database management system (RDMS) for the storage and retrieval of data. Any suitable type of relational database may be used. One example of a suitable database is one using Oracle software. The RDMS is used for the concurrent storage and retrieval of data related to the invention including security level information and temporary state data posted from the Internet browser of a user. The security information stored in the RDMS is used to control what a user can do or to control the type of information a user can access (described in more detail below). The RDMS also stores state data received from the Web browser of the user. Since Web browsers do not store the various variables needed by the system, the RDMS stores items such as inputted data and information relating to what Web pages a user has accessed. The state data stored in the RDMS allows the system to keep track of where the user is (in a transaction, for example), and is used to make sure the system has all the necessary data from a user.

The use of state information stored in the RDMS is also used, in combination with a control script, to restrict and/or redirect Web browsers to only to those web pages in which the user is allowed access. This technique is used to limit the extent that the "back" button on a Web browser operates. Using this technique, a user is prevented from completing a transaction with incomplete data, or from going back and changing previously inputed data. As a result, data entered into the system is carefully controlled, and the integrity of the RDMS is maintained. In one example, where a user is using a Web browser to complete a transaction comprised of a number of steps, if the user goes back from step 5 to step 2 of the transaction, the system can delete the data from steps 3 and 4. Again, this maintains the integrity of the data in the RMDS. In another example, if a user completes a transaction and attempts to go back to a previous transaction, the system will prevent the user from going back. The "control" script uses a limited amount of state data stored in the browser to identify a collection of actual state data stored in the RDMS. This allows the system of the present invention to accumulate large amounts of state data for each user session without passing large amounts of state data between the browser and the Web server. The system can also use this script to make changes en masse to the state data when user requests to abort a transaction or requests to jump to a different application.

The security information stored in the RDMS is used in the following manner. A common gateway interface (CGI) script is used with the present invention to manage users' access to the system application. The CGI script manages the users' access to the system application by monitoring where a user has been and maintaining where a user is during a transaction. The CGI script could be considered to be a transaction monitor. The functions of the CGI script include regulating access to transactions based on security level information stored in the RDMS and monitoring steps completed by a user in the process of completing a transaction. Every posting operation received from the Web browser of a user is directed through the CGI script to maintain the integrity of the system application. Direct access to CGI scripts, other than this particular script, is not permitted by the Web server.

The security system of the present invention assigns multiple security levels to users who are then subjected to a three-dimensional map of access options. The first dimension of the map restricts the user to a fixed list of transactions in which the user is allowed to run within the system application. For example, at one level, a user may be able to modify certain parameters, but not other parameters. The second dimension restricts which records a user can work with in the transaction. The third dimension restricts which data elements the user can work with within a record. For example, a certain user may be able to decrease the number of acres or bushels allocated in a transaction, but not increase the number of acres.

Another program running outside the Web server monitors the state data stored by the system application. When state data expires, because the user hasn't made requests through the system application during a certain time period, the data is removed from the RDMS. This effectively provides an "inactivity timer" which improves security when Web browsers are left unattended by users.

The present invention uses other CGI scripts to perform various functions. Following is a description of several of the CGI scripts.

One CGI script, which is used with the preferred embodiment of the present invention, allocates acres or bushels granted by administrators to each elevator distributor and seed company. This feature can be thought of as an "open to contract" which defines an end-use buyer's willingness to contract a certain number of acres or quantity of a specialty crop (such as grain or oilseeds, or beef cattle) through a particular elevator or seed firm.

Another CGI script defines the conditions of each contract program. In other words, the script defines whether an end-use buyer offers to buy specific grain at harvest delivery or at "buyer's call" delivery or for delivery at specific times.

Another CGI script defines the specific legal contract which is available for Internet downloading and, when manually signed by both parties, defines the buy-sell relationship between the food producer and the grain producer.

Another CGI script defines the dynamic changes in acres or bushels allocated to each distribution chain participant (for example, an elevator or seed company). The number of allocated acres is determined by the number of acres currently under contract, the rate of change in the number of acres under contract, the number of acres which the end-use buyer is willing to contract, and any decision by the end-use buyer or the distribution chain participant to increase or decrease the acres allocated to that the participant for any given contractual program.

Figure 7:
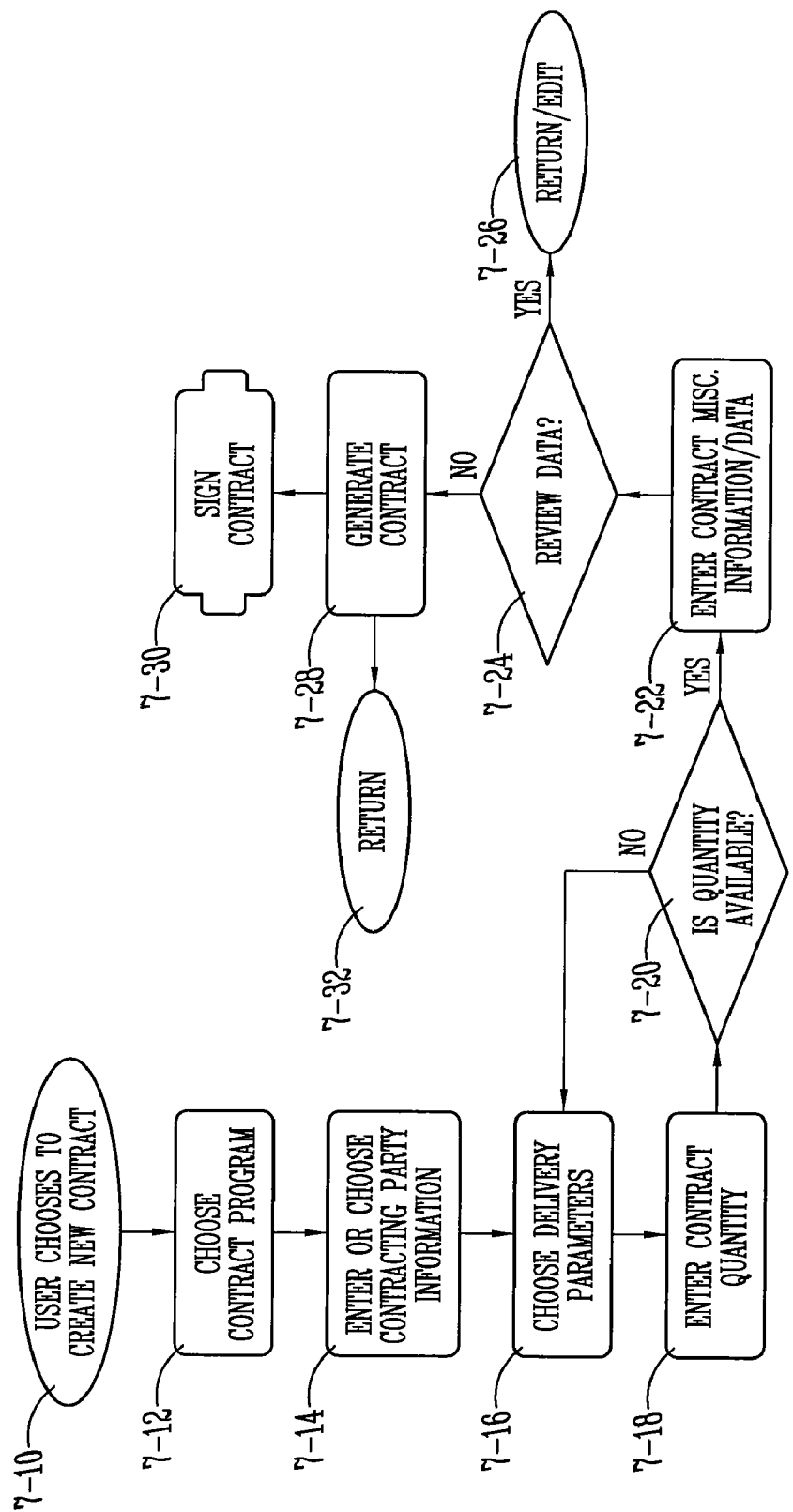

FIGS. 7–9 are flow charts illustrating several important functions of the present invention. Note that the flowcharts shown in FIGS. 7–9 relate to the preferred embodiment of the present invention (the contracting of agricultural crops). However, the scope of the invention is not intended to be limited to the preferred embodiment.

FIG. 7 is a flow chart illustrating the steps involved in creating a new contract using the present invention. After choosing to create a new contract (step 7–10), a user will be prompted to choose a contract program (7–12), for example, a specialty hybrid corn program. The user will then enter or choose contracting party information (7–14) as well as choose the crop delivery parameters (7–16). Next, the user will enter the contract quantity (7–18). For example, a user may choose to contract 100 acres of specialty hybrid corn. In the next step (7–20), the system will determine whether the entered quantity is available for contracting. In other words, the system will determine whether the number of acres entered in step (7–18) is less than the total number of acres of specialty hybrid corn that the contracting end-use buyer is willing to purchase. If the quantity is not available, the process moves back to step (7–16), choosing the delivery parameters. If the quantity is available, the user is prompted to enter miscellaneous contract information and data (7–22). Next, the user is asked whether the user wants to review the data (7–24). If so, the user reviews and edits the data (7–26) and then returns to step (7–24). If not, then a contract is generated by the system (7–28). At this point, the system is capable of printing an actual contract to be signed by the parties (7–30), or the system can return to the main menu (7–32). In an alternate embodiment, the parties can execute electronic contracts, rather than signing paper contracts.

FIG. 8 is a flow chart illustrating the steps involved in managing existing contracts using the present invention. After choosing to manage existing contracts (step 8–10), a user will be prompted to choose an existing contract to manage (8–12). The system then determines which contracts that particular user has access to (8–14). If the user has access to the chosen contract, the user is allowed to edit the contract information (8–16). The system then determines whether the user has edit privileges for that particular contract (8–18). If not, the user is returned to the step of choosing a contract to manage (8–12). If so, then the user is allowed to edit the contract (8–20). Next, the user is asked whether the user wants to review the data (8–22). If so, the user reviews and edits the data (8–24) and then returns to step (8–22). If not, then a contract is generated by the system (8–26). At this point, the system is capable of printing a contract to be signed by the parties (8–28). Again, in an alternate embodiment, the parties can execute electronic contracts, rather than signing paper contracts.

FIG. 9 is a flow chart illustrating the steps involved in the contract quantity allocation process. As mentioned above, the present invention is capable of providing information related to the real-time dynamic allocation of available acres. The invention provides a mechanism to automatically decrement acres available to distributors every time a contract is issued. After choosing to edit a contract (step 9–10), the quantity of the contract is adjusted (9–12). Next, the system determines whether the quantities are less than what are available (9–14). If not, the system determines what the remaining allocations are (9–16). Next, the desired contract quantities by a certain delivery period are entered (9–18) and the system returns to step (9–14). If the quantities are less than what are available (9–14), the system adjusts the allocation availability (9–20) and the contract is finalized (9–22). FIG. 9 also illustrates that after the contract quantity allocations are viewed (9–24), a user may choose a delivery location (9–26), and the system moves to step (9–16) described above.

FIGS. 10–28 are views showing computer screen displays of the preferred embodiment of the present invention. FIGS. 10–28 are intended to illustrate various screens which a user would see via any Internet Web browser. The Web browser configuration shown in the figures is intended to be generic. Examples of suitable Web browsers include NETSCAPE NAVIGATOR and INTERNET EXPLORER. The invention may also be used with non-browsers having similar functions, such as applets based on the Java programming language.

FIG. 10 shows a logon screen that a user will first encounter in the contract management system of the present invention. As shown, the user may select the "Login" option (via GUI button on screen) and proceed to another generic screen that requests the user's assigned name and password. Once logged in, the user will view the screen shown in FIG. 11. The screen of FIG. 11 allows a user to select among six options: "Make a new contract", "Manage Existing Contracts", "Delivery Management", Administration", "View reports and information", "Variety data".

FIG. 12 illustrates a screen showing an available acreage report for a hybrid corn program. As shown, a number of companies are listed along with their location and the number of acres available for each company.

Figure 13:

FIG. 13 illustrates a screen providing the user the option of selecting from a number of programs or contract types. In the example shown, the user may select between various "Hybrid Corn Program/Buyers Call" program/contract types. Another type would be "Hybrid Corn Program/Harvest Delivery." Others, such as are known in the art, are possible.

Figure 14:
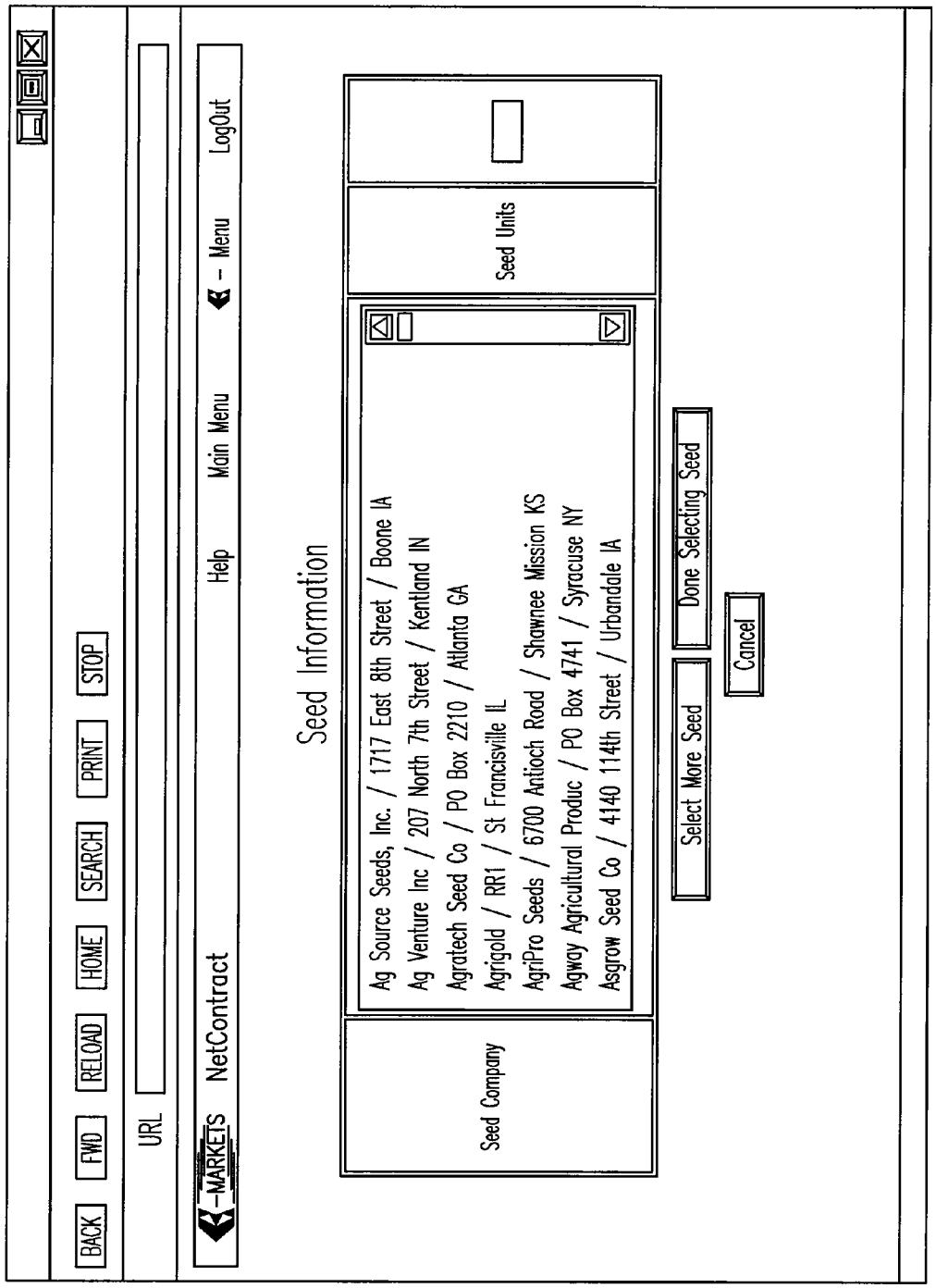

In FIG. 14, the user is prompted to select seed from various companies. In this example, the user can select from multiple seed companies using the "Select More Seed" button, and can select the number of units to be purchased from each company. Once the selections are made, the user can click on the button labeled "Done Selecting Seed" to enter the selection.

Figure 15:
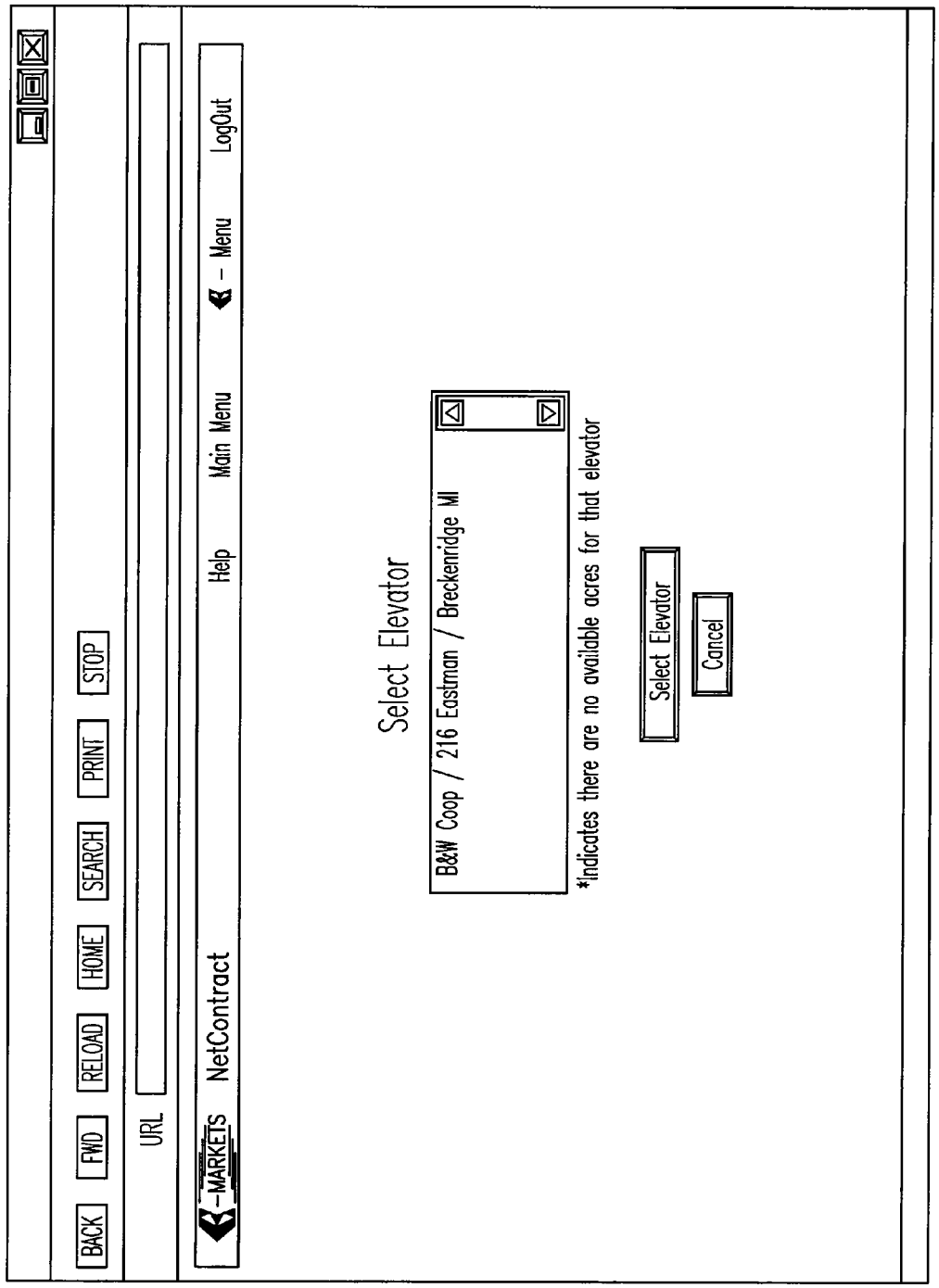

In FIG. 15, the user is prompted to select an elevator from a list of possible elevators (only one shown but can be a plurality). Once the selection is made, the user can click on the button labeled "SELECT ELEVATOR" to enter the selection.

In FIG. 16, the user is prompted to enter (via data eating device, e.g. keyboard) the acreage desired. The display could identify the program and/or contract type, e.g., a "Buyer's Call" option (selected previously), which denotes a delivery window during which the buyer may "call" for grain delivery, as well as the number of acres available at various time periods (e.g., 1600 acres in October through March.). In the time periods with acres available, the user may enter a number of acres to be contracted into the box shown. Once the entries are made, the user can click on the button labeled "Enter these windows" to enter the entries.

Figure 17:
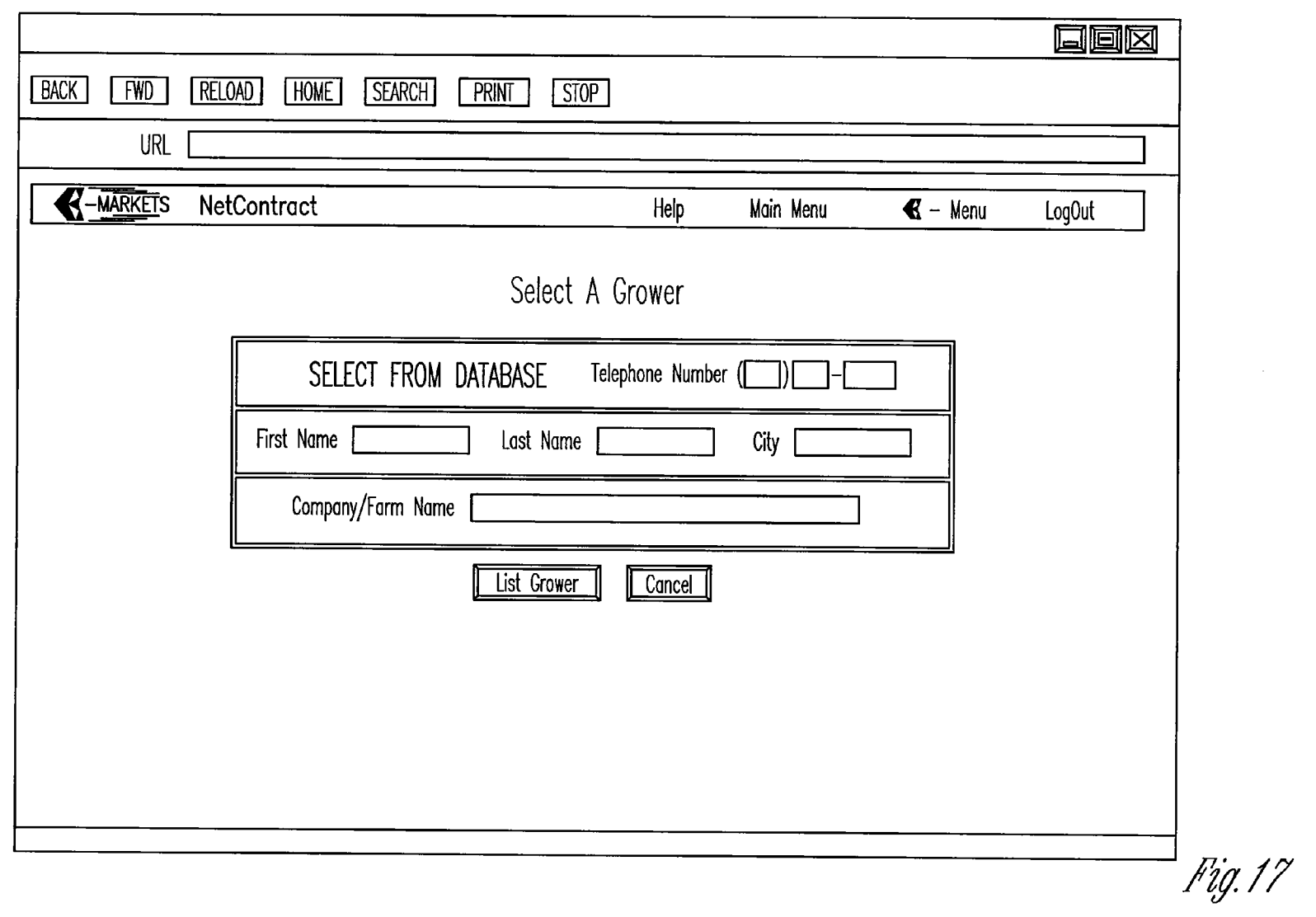

In FIG. 17, the user is asked to select a grower from an existing database of growers. To select an existing grower from the database, various information may be entered and then the "LIST GROWER" button pressed. To add a new grower, a user adds no data and clicks on the "List Grower" button to bring up a screen (not shown), allowing information to be entered regarding a new grower.

Figure 18:

FIG. 18 shows the screen displayed after making a contract. Once the user has entered the "Make a new contract" option of Screen 11 and passed through the selections noted in screens 12 through 17, the system will assign a contract number for each contract.

FIG. 19 shows a screen displaying a partial sample contract resulting from the entries made by the user. To execute the contract, a user will print out the contract and have all the required parties sign the contract. Alternatively, the contract could be electronically executed.

FIG. 20 shows the screen displayed when a user chooses to manage an existing contract. By selecting the buttons to the left on the screen, the user can change appropriate information. Data items that are not able to be changed are indicated with lined circles. Should the user desire to disable the contract button, selecting the "Disable this contract" will lead to another screen that confirms the selection and then removes the contract from the list of valid contracts.

Figure 21:

FIG. 21 shows the types of reports generated by the system of the present invention. FIG. 21 shows a menu of report types that may be generated by the system. It includes a selection for a custom reporting tool that allows the user to define particular reports not already programmed in the system.

Figure 22:

FIG. 22 shows further report choices if the user had selected the first button of FIG. 21. Various reports of contracts may be printed or saved, including selections by program, by stage of contract and by custom format programmable by the user.

Figure 23:
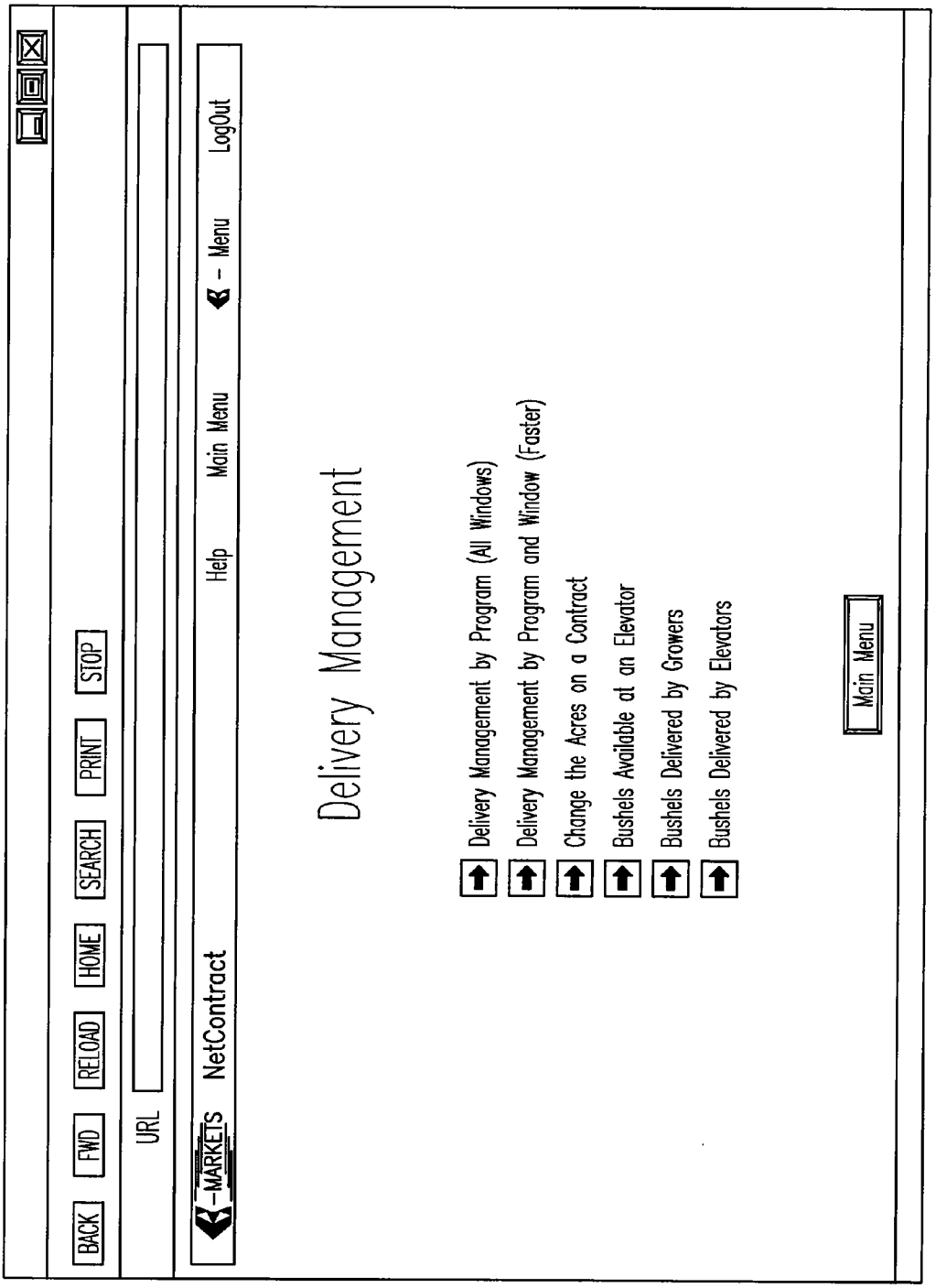

FIG. 23 shows the delivery management selection menu, allowing the user to manage forecasted and actual deliveries by farmers and elevators. Each selection leads to further delivery management screens that allow additional selections and data choices.

FIG. 24 allows the user to select an elevator delivery point to manage. FIG. 25, the result of a specific elevator selected on FIG. 24, allows the user to enter estimated crop yields or delivered bushels for each farm producer under contract and also to note whether delivery to the elevator has been completed.

Figure 26:
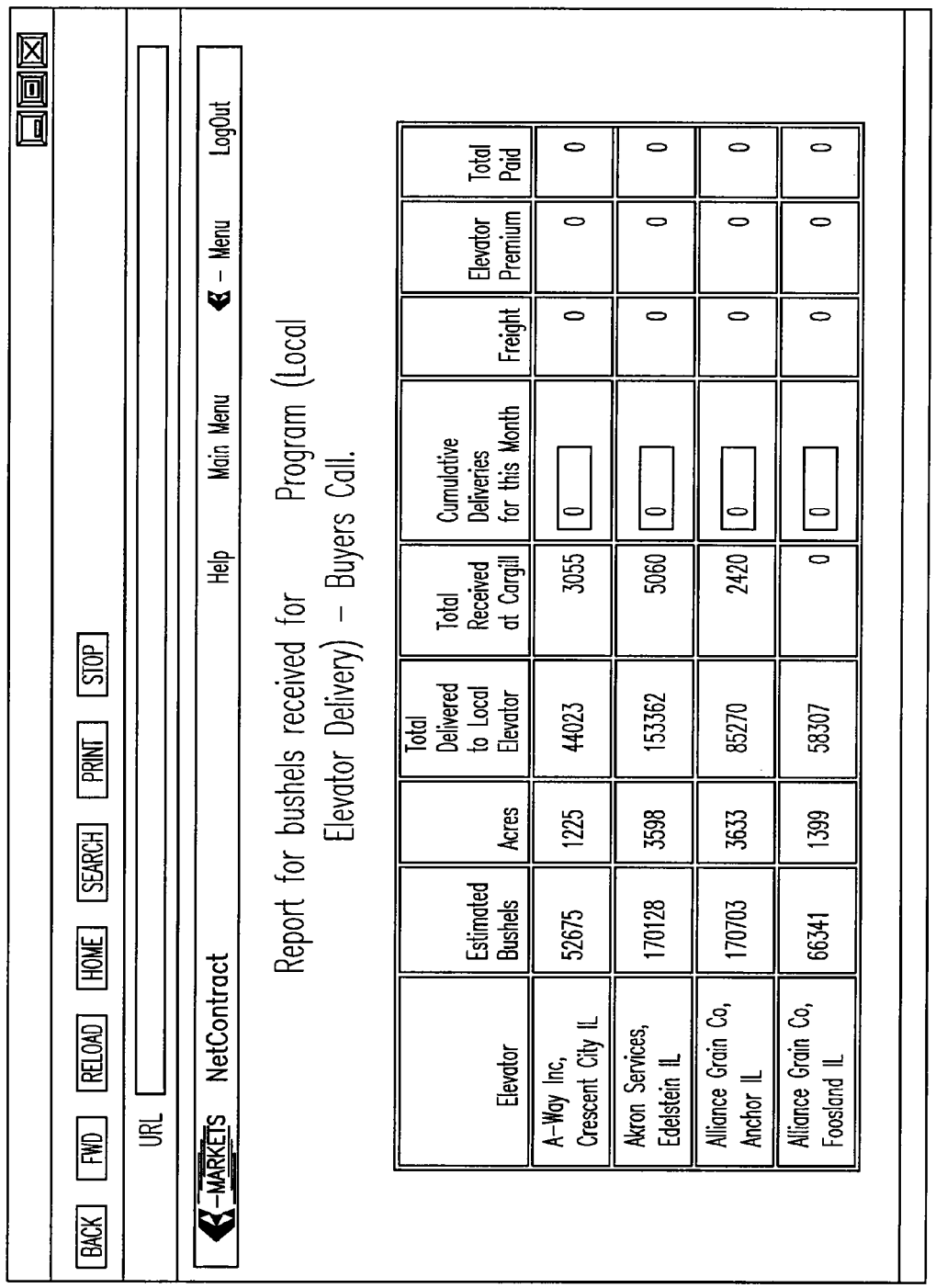
Figure 28:

FIG. 26 allows the user to view information on cumulative deliveries to each elevator participating within a specific grain program or contract type and to modify the current month's deliveries for yield variation or other reasons. The user may also view various premiums to be paid for these deliveries, including freight and elevator premiums.

The present invention may include various alternatives within the scope of the invention. For example, a testing mechanism can be incorporated into the system. In each load of grain (or other product), a sample can be taken and tested for characteristics such as weight, moisture content, constituent contents, etc. In one example, a near infrared (NIR) spectrometer may be used in conjunction with a computer to measure constituents of the sample and upload the results to the system. The end-use buyer will then have this information available (via the Internet) in real-time. Similarly, the yield of the crops can be uploaded into the system to provide yield data (and the time frame) to a user.

In another embodiment, settlement and payment information may be included with the system to track debts and credits as well as transfer funds between users' accounts. The system can provide parties with information relating the quantity of products delivered, as well as verification that the product was delivered.

In another embodiment, a grower is provided with a screen prompting the user for a zip code. By entering a zip code, the system will display a list of the agricultural products available to the grower for contract production. The grower may then enter into a contract for the agricultural products as described above.

While the preferred embodiment has been described primarily for use with specialty grains, other agricultural products may by used with the present invention including potatoes, sunflowers, horticultural products, fruit, etc. The present invention is also not limited to crops. The livestock industry can also utilize the present invention. For example, if an end-use buyer needs a supply of meat (e.g., beef, pork, poultry, etc. which may have specific product or quality requirements), the buyer can contract with producers to raise the livestock.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention.

Figure 29:
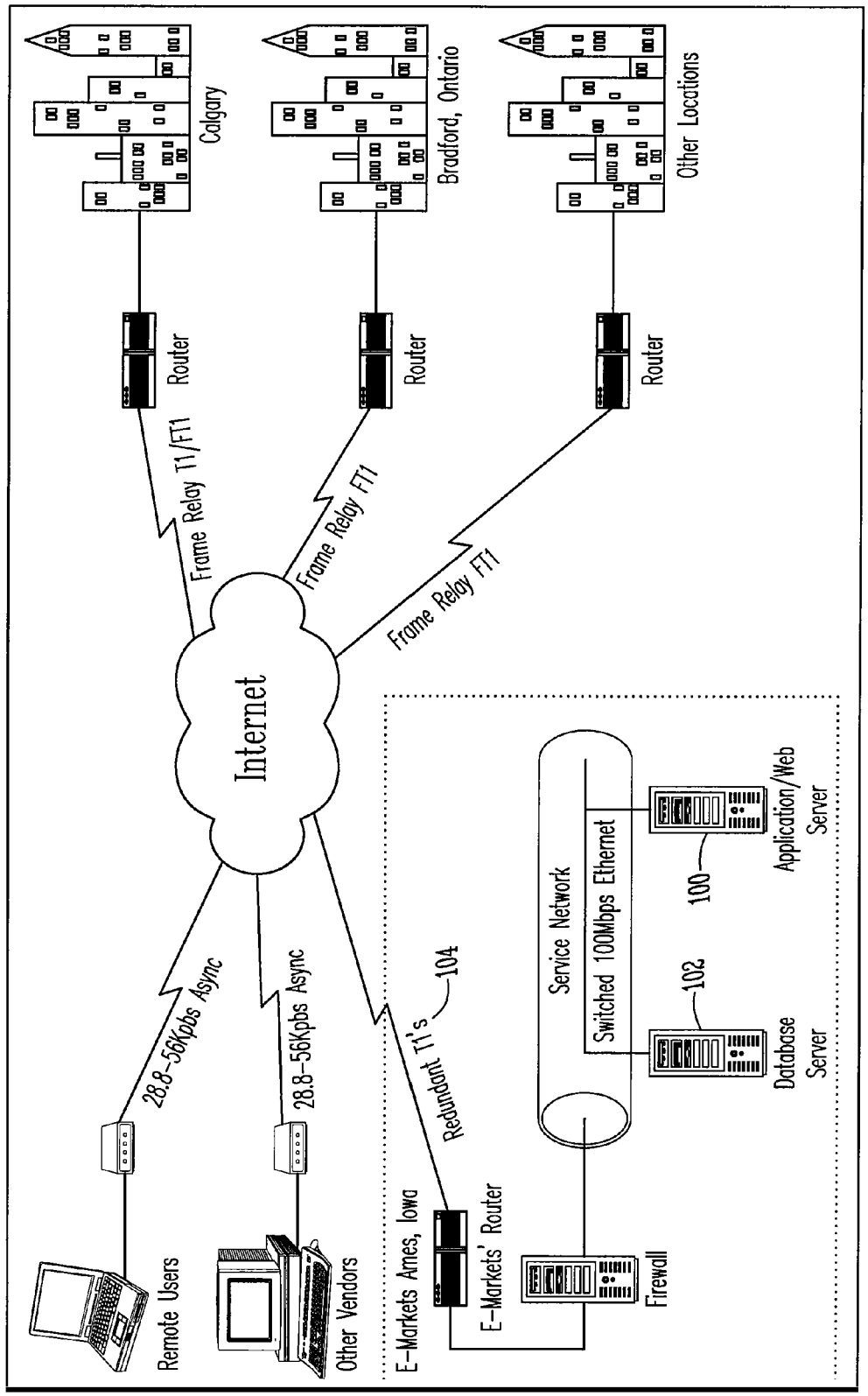
FIG. 29 is a diagrammatic depiction of a system according to an embodiment of the present invention.

For example, FIG. 29 illustrates diagrammatically a particular system set-up and communications network that could be used with the present invention. For locations with more than three or four users, dedicated circuits should be used. Options vary by location and are dependant on the services offered by local Internet service providers. Possibilities include dedicated 56K, ISDN, and frame-relay.

For secure communications between sites, virtual private network nodes may also be installed at each site. A VPN allows network traffic to be tunneled between two or more sites securely over the Internet. VPN technology allows sites to build wide-area networks without the expense of buying and managing dedicated circuits for each location. This system and the communications and protocols are known in the art.

The invention can be used for management of contract crop production systems of value-enhanced grains such as high-oil corn, white corn, waxy corn, and high oleic soybeans or manage contract production of high oil corn and modified trait soybeans.

It can handle thousands of registered users, ranging from corporate managers to grain elevator managers to seed company farmer sales representatives.

It also can apply to the food animal production and meat industries. The invention can help firms to manage forward contracting, price discovery, delivery management and communications among processors and animal producers.

The invention's applications can work in the Internet's World Wide Web environment. Web-based applications are popular because of widespread access, low cost, ease of use and administration, and adaptability. Specifically, applications are browser-based. In other words, they run directly from browsers such as Netscape Navigator or Microsoft Internet Explorer, not from a separate piece of software. The navigation metaphor of the Internet is one of its greatest attractions over traditional network systems.

A feature of the invention's applications is a transaction and security platform that serves as a foundation for secure electronic commerce and data sharing. The platform manages user security privileges as well as the execution of transactions within the application. The applications can be written in PERL, and the application code can be executed within modified web server software. The applications also utilize an enterprise level relational database.

The system according to the invention is delivered in the form of a centralized application server that can be accessed through a web browser. As previously described, the major components of the application server could be a firewall, a web server, a database server, a security and transaction platform, and application-specific code.

The centralized application server allows many users to access the application through their web browser and is enormously scalable. The underlying security platform delivers the options and information individuals have access to dynamically. Modifications to the system are delivered to users instantaneously. Access to underlying databases is real-time. Finally, the system is flexible enough to accommodate a variety of "linkages" to other software packages, legacy systems, or ERP systems.

Development of functionality can be an ongoing process because of the centralization of the system; upgrades are centrally controlled and user management is not an issue; multiple "points of failure" are eliminated from the system as complex remote hardware configurations are not a part of the system; and the client-server model can be flexibly and quickly adjusted as client needs and technology change.

Browser-based applications offer a number of general advantages.

a. The navigation metaphor of the Internet is one of its greatest attractions over traditional network systems. Click on a hyperlink to go to another document. Click on back arrow to backtrack. Click on forward arrow to advance, and so on. If a user has an Internet connection, a browser, and a username and password, they are ready to login.

b. The scalability and administration of browser-based applications is particularly attractive. Additional users are added to secure applications without significant problems and changes can be made to the application on the centralized server while remaining transparent to users. Administration of the applications can also be as centralized or decentralized as necessary.

c. Browser-based applications offer a range of security options ranging from encrypted data transfer to public-private key verification technology.

d. Costs of development, deployment, support, and refinement of browser-based applications are a magnitude less than traditional wide area network systems.

Browser-based applications are a first generation working example of the vision of "write once, run anywhere" software solutions that are commonly discussed by the software industry.

The Internet offers a unique model for data transfer. The Internet as we know it is simply a set of computer hardware and software standards, or "protocols" that allow computers to exchange data with other computers. The computers can be in the same room, or they can be located around the world from each other. FIG. 27 illustrates this point.

Server 100 is the starting point of its applications. Capacity is controlled entirely at that central site, and communication connections are upgraded as needed to accommodate increased traffic.

User site connectivity is controlled by the choice of Internet accessibility. It is recommended that sites with more than three or four users use dedicated lines to access the Internet. Less frequent users can access the Internet using modems. Speed will depend on modem capability.

The Internet itself is a decentralized environment offering no control over capacity. Often times, connectivity depends on the quality and level of service of the local Internet service provider. The Internet backbone does not currently offer service guarantees. Experience with thousands of users is positive in terms of general Internet reliability.

Every user has a unique username and password. Users can reset their password at their convenience. All data including username and password, can be encrypted. User "sessions" are timed and users are logged off of applications after a desired period of inactivity.

A user profile is maintained for each user where consequent security and access levels are defined. Access to applications for users is administered along with security group membership within applications. The applications according to the invention are comprised of a number of individual transactions, each of which has its own security and access rule. Security groups can be designed such that each has specific sets of privileges among the many transactions that comprise an application (e.g. see, FIG. 27). Administration of security takes place through a browser-based application as well (e.g., see FIG. 28).

Data security procedures can also be provided which will include a back-up of magnetically stored data files kept or processed for the customer, in a reasonable manner and keeping with generally accepted data industry standards. Client data can be backed up to tape daily.

FIG. 29 illustrates that one embodiment of a system according to the invention can include a web/application server 100 and a database server 102. The database server can support up to 4 processors, 4 GB of RAM, and 45 GB of online, redundant storage.

Additional capacity can be obtained through the use of distributed database technology and server clusters. Thin-client architecture could be used, so any changes in the database technology are transparent to the user.

All user state data is stored in the database, so web/application server 100 can easily be distributed to multiple machines hosting the same application. Changes can be made to the underlying hardware without effecting the software configuration on user's PC's.

The system can check all user input, either through browser forms or file upload buttons. Regular expression pattern matches can be used to copy form data from the browser into the application. Data that doesn't match the specified pattern can be ignored or generates an error condition depending on the transaction. Users do not have direct access to the underlying database.

The following is a brief summary of Web application backup and recovery. Options:

a. All production servers have RAID controllers which allows data redundancy across multiple drives.

b. All servers have redundant, hot swappable drives and power supplies.

c. All servers are on a UPS.

d. A natural gas powered on-site, automatic backup generator can be dedicated to the servers.

e. Redundant T1 communication lines to the Internet.

f. "Warm" spares for routers, hubs, and other networking equipment.

g. Daily tape backups five days per week. Daily backups are retained off-site for six weeks.

h. Archive backups the first Saturday of each month. These monthly backups are stored for two years in a bank vault.

Several steps can be taken to prevent disaster. All servers are on UPS units that can sustain the equipment for 15–20 minutes. In addition, a natural gas backup generator can power server and network equipment indefinitely.

Connectivity to the Internet is maintained through redundant T1's (see FIG. 29 at 104) that are routed over diversified cable plants. The primary cable plant is maintained directly by the Internet service provider (ISP). The alternate cable plant is maintained by the incumbent local exchange carrier. A collocation agreement can be attained with the ISP.

The following summarizes the network environment:

a. Redundant T-1 telecommunication lines (104 from an ISP;

b. Telephone support between 8 a.m. and 5 p.m. local time, Monday through Friday, excluding holidays;

c. Additional telephone support and training as necessary during system deployment d. Full-time system performance monitoring, including communications and server performance, and usage statistics;

e. System back-up, including hardware mirrors and tapes
f. Account management;
g. Software defect and "bug" repairs;
h. Limited refinement of administrative tools;
i. Server security.

The system is designed to work over a 28.8 KBPS connection to the Internet. Some transactions, such as a large file upload or download, may only be practical for user's on a LAN with a dedicated connection to the Internet.

Each site will need to obtain an Internet connection appropriate for the number of users that need access to the application. In most cases the network equipment will be managed by the local ISP.

The system can be set to generate in a secure SSL encryption environment. This ensures security of data exchange over the internet medium. The recommended commercial browsers to access the system are; Netscape 3.0 or higher, Microsoft's Internet Explorer 4.0. Manufacturer's recommended hardware requirements for these products are: Pentium 100 or higher processor, and a minimum of 16 Mb of RAM (Netscape 3.0) or 32 MB of RAM (Netscape 4.0 and Internet Explorer 4.0). E-Markets requires the use of 40 or 128-bit SSL encryption.

Figure 30:
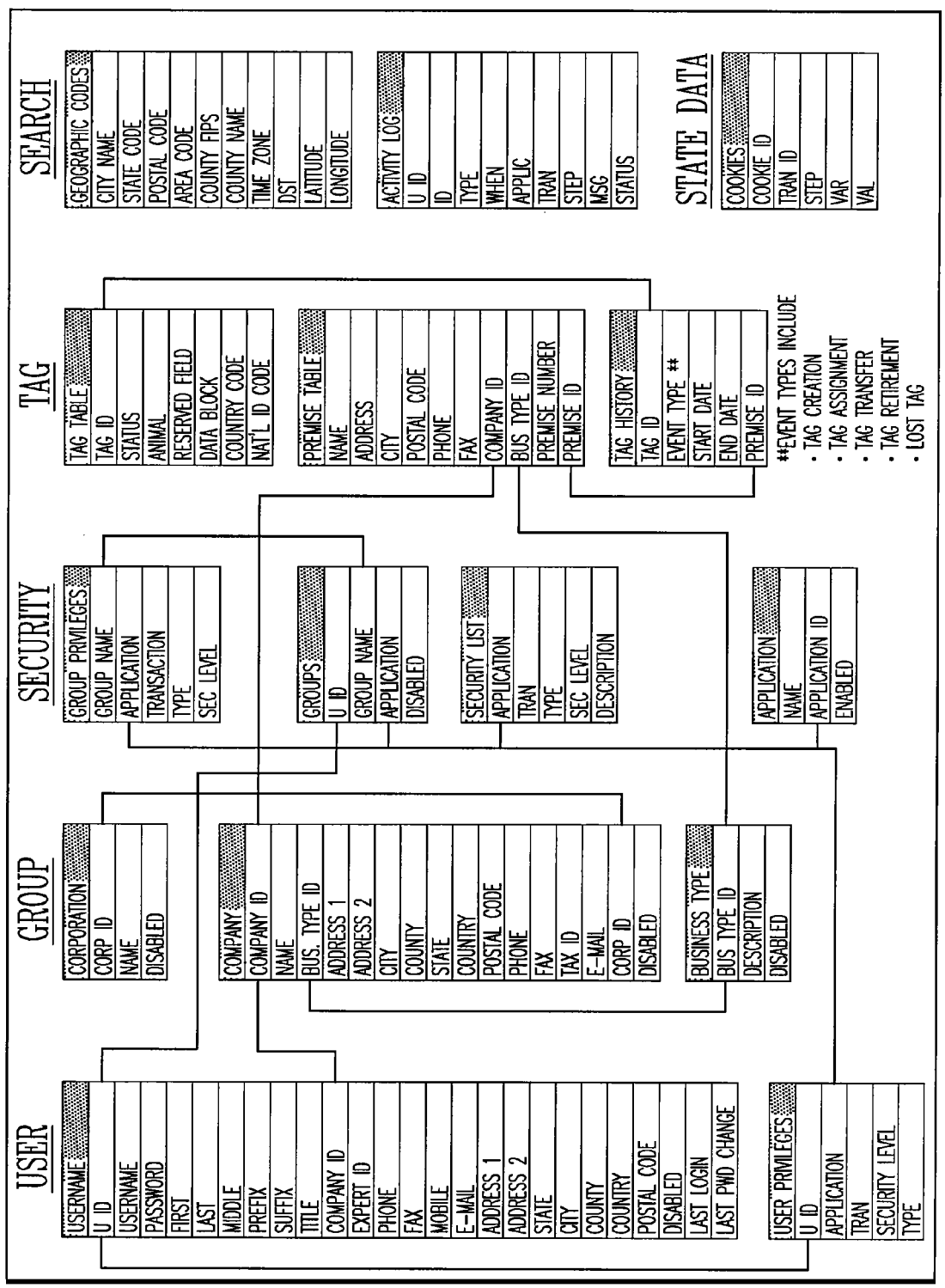
FIG. 30 is a graphic illustrating a data structure according to an embodiment of the present invention.

The normalized data model presented in FIG. 30 is an example of is a conceptual design for the system according to the invention. It represents an example model for a database structure.

The data structure follows the above-described configuration for user, group, security and transaction data as well as a tag database structure.

Version control and upgrade procedures are uniquely manageable in an Internet environment. Applications run on a centralized server allowing changes in the server to populate new versions and upgrades to be populated instantaneously to users, thus saving significant time and support cost.

Testing of all modifications can be made on a development server that mirrors the production server in configuration. After a structured testing process is completed, modified code is ported from the development server to the production server whereby the upgrade is complete.

Several of the most widely utilized applications have changed weekly, if not daily, after initial deployment. Application modifications ranging from editorial changes to new modules to streamlined functionality have been made "on-the-fly," much to the satisfaction of clients. The centralized server development model offers clients enormous flexibility in development, deployment, and evolution of applications.

Upgrade of user functionality of applications are managed according to the complexity and scope of the change. For example, a new report of small modification in functionality is normally made known to users using a dedicated application; as users login to the application they automatically receive a message describing the modification. More extensive modifications may be managed through direct phone or personal contact with users that are affected by the modification.

The system can include a context sensitive help module. Users can strike the help button (see, e.g. FIG. 11) on whatever screen they are on and get specific help on issues for that screen.

Standard utilities that can be included with the system include several user-level and several client-level tools. Examples of users tools include the ability to modify passwords and the ability to change their user profile. Client utilities include the ability to search application log files and other application-specific administrative functionality.

Data archiving could be accomplished as follows. All data, including historical data, could be maintained online in the database. Historical data is stored in a separate data set that mirrors the original tables used in the application. In some cases data is denormalized to maintain its integrity over time.

If data did need to be archived on tape due to disk space restrictions, a request queuing system could be implemented for archived data. An end-user can submit a web based form to request the restoration of data from tape. The data would be restored into an archive data set in the application. After a predetermined amount of time, the data would be expired from archive system.

Current, historical, and archive reports are all generated through a reporting tool. This tool uses a "report basis" to describe access controls, record selection options, calculated fields, and formatting options available to the end user.

As "current data" basis files are created and modified, the client has the option to make them available for historical and archival reporting as well. Custom report basis may also be generated for history and archive data.

"Snapshots" of the entire data base system can be taken hourly from 4:00 AM to 1:00 AM. During the snapshot, read-locks are placed on all application specific tables. The system remains online but modifications may not be made. Snapshots are maintained for a 24 hour period. During the daily tape backup, all 20 snapshots are written to tape. The active database files are excluded. This prevents locking the database for extended periods of time.

A Report Generator is easily added to the system for reporting from underlying databases. It can be used to generate system reports as well as give users the ability to build and save individualized custom reports. It allows users to display and download data in any number of ways. The tool could include the capability to allow charts and maps to be generated from the data and displayed in a web browser.

Importing and exporting data from/to legacy systems is handled on an as needed basis by staff. The client will need to provide a record format specification. Delimited text file downloads are available through the custom report generator. For reoccurring import/export operations, transactions or CGI scripts can be provided that allow the client to automate the process.

What is claimed is:

1. A method of facilitating the formation of agricultural contracts for the future contracting of agricultural commodities using the Internet comprising the steps of:
   (a) providing a Web server connected to the Internet;
   (b) providing, in operative communication with the server, a centralized database system for the storage and retrieval of data including data related to types or amounts of an agricultural commodity;
   (c) storing data in the database system relating to types and amounts of agricultural commodities desired by one or more potential agricultural commodity buyers and establishing a defined allocation of an amount of a type of agricultural commodity according to at least one allocation parameter, wherein at least one of the at least one allocation parameter is set to reduce risk associated with future contracting of agricultural commodities;
   (d) in response to a command input into the system, displaying a listing of desired commodities including information related to the types, amounts available or deliveries committed of the commodities;

(e) in response to input from a buyer or supplier, designating a specific contract program;

(f) after being provided the ability to review listings on the system, receiving input data from a potential supplier for an agricultural commodity relating to a specific type and amount of a commodity which the supplier is willing to commit to growing and supplying to the buyer at harvest or after harvest;

(g) comparing the input data from the supplier with current data from the buyer, including desired type, amount available, and the at least one allocation parameter:

(h) if the input data from a supplier exceeds the amount of an allocation parameter for the supplier, requiring resubmission of at least some input data from the supplier for the supplier to continue;

for a specific type and amount of the commodity to be grown or provided by the supplier for the buyer for review and consideration by buyer and supplier; and (j) dynamically and in substantially real time automatically decrementing the current amount available for contracting each time a pending contract is issued.

2. The method of claim 1 wherein information inputted into the system is inputted via a Web browser.

3. The method of claim 1 wherein information inputted into the system is inputted via an applet in Java or another program language.

4. The method of claim 1 wherein the agricultural commodities are comprised of agricultural products.

5. The method of claim 4 wherein the step of storing data in the database system relating to types and amounts of agricultural commodities further comprises the steps of:

storing data identifying a quantity of agricultural products desired by the buyer; and storing data related to a desired allocation of the quantity of agricultural products among a plurality of areas.

6. The method of claim 4 wherein the step of displaying a listing of desired commodities further comprises the steps of: displaying a listing of desired agricultural products available in desired areas; and updating the listing to reflect a change in data as a result of contracting between the supplier and the buyer.

7. The method of claim 1 wherein the agricultural commodities are comprised of commodity grains or oilseeds.

8. The method of claim 1 wherein the agricultural commodities are comprised of fruits or vegetables.

9. The method of claim 1 wherein the agricultural commodities are comprised of animals or fish.

10. The method of claim 1 wherein the agricultural commodities are comprised of horticultural products or ornamental plants.

11. The method of claim 1 wherein the contract generated is a paper contract.

12. The method of claim 1 wherein the contract generated is an electronic contract with stages of review and approval by both parties after input is validated by the system and is executable using digital signatures.

13. The method of claim 1 further comprising converting a pending contract to a binding contract upon acceptance of a buyer and a supplier.

14. The method of claim 1 wherein the allocation can change from time to time.

15. The method of claim 1 wherein the integrity of data in the database system in which data is entered using an Internet Web browser comprises the steps of:

providing a control script which uses a limited amount of state data stored by the Internet browser during the execution of a task, the state data stored by the browser identifying a subset of master state data stored in the database system;

entering the state data stored by the browser into the database system to update the subset of the master state data upon the completion of the task; and preventing the state data stored by the browser to be entered into the database system and updating the subset of the master data when the task is aborted by the user.

16. The method of claim 1 further comprising the step of requiring a supplier to reenter input data that does not qualify as to quantity and allocation parameter.

17. The method of claim 1 further comprising automatically decrementing the database upon formation of a contract.

18. The method of claim 1 further comprising providing security levels to the system.

19. The method of claim 18 wherein the security comprises varying levels of access to data by authorized users of the system.

20. The method of claim 1 further comprising a plurality of buyers and a plurality of suppliers.

21. The method of claim 1 further comprising generating a message for a buyer or supplier relative to an allocation parameter.

22. The method of claim 1 wherein the allocation parameter is a geographic region in which the allocation of the agricultural product is grown.

23. The method of claim 1 wherein the allocation parameter is based on delivery time factors.

24. A method of facilitating and tracking the formation of agricultural contracts for the future contracting of agricultural crops using a wide area distributed network comprising the steps of:

(a) providing a centralized database system for the storage and retrieval of data;

(b) storing data related to the number of acres or bushels of agricultural crops desired by one or more agricultural commodity buyers and establishing a desired allocation of an amount of a type of agricultural product available to a grower according to at least one allocation parameter, wherein the at least one allocation parameter is set to reduce risk associated with future contracting of agricultural commodities;

(c) storing data related to the number of acres or bushels of the agricultural crops committed for the production of the crops by one or more growers;

(d) displaying a listing of the desired crops including information related to the number of acres or bushels desired and the number of acres or bushels already committed;

(e) receiving input data from a grower relating to a specific amount of the crop which the grower is willing to commit to the desired agricultural crop, comparing the input data from the grower with current data from a buyer regarding type, amount, and allocation parameter, and (1) if input data exceeds amount of an allocation parameter for the grower, requiring resubmission of at least some input data from the grower for the grower to continue;

(2) if input data does not exceed amount for the allocation parameter, generating a proposed agricultural production contract for a specific type and amount of the crop to be produced by the grower for the buyer for review and consideration by buyer and grower;

(f) if a proposed contract is issued by agreement of the buyer and grower, updating the data in the database to reflect the additional acres committed by the grower as indicated in the input data so that the listing of the desired crops can be displayed in real time showing the allocation of acres or bushels committed to the desired crop.

25. The method of claim 24 further comprising electronically managing delivery times and methods by buyer input and inclusion into a contract.

26. The method of claim 24 further comprising electronically managing quality data for growing or delivered products by buyer input and inclusion into a contract.

27. The method of claim 24 wherein a material term of the contract includes pricing, further comprising electronically pricing the contract based on a variable.

28. The method of claim 27 wherein the variable is selected from the set comprising time of delivery and a quality measure.

29. The method of claim 24 wherein the centralized database system is installed on an Internet Web server, and users of the database system access the database system via an Internet Web browser.

30. The method of claim 29 wherein the centralized database system is installed on an Internet Web server, and users of the database system access data using Java or another applet.

31. The method of claim 24 wherein the agricultural crops further comprise agricultural products.

32. The method of claim 24 further comprising the step of allocating among a plurality of elevators the stored data relating to the number of acres of agricultural crops desired.

33. The method of claim 24 further comprising the step of allocating by distinct geographic regions the data related to the number of acres of the agricultural crops desired.

34. The method of claim 24 further comprising the step of allocating the data according to one of the following: product type, time of delivery, method of delivery, end-user buyer.

35. An apparatus for the formation of agricultural contracts for the future contracting of agricultural commodities over a wide area distributed network comprising:
    (a) an application/web server;
    (b) a database server;
    (c) a communications link between the application/web server and the database server and the wide area distributed network;
    (d) one or more remote user terminals;
    (e) software on a computer storage medium which facilitates;
    (f) storing data in the database system relating to types and amounts of agricultural commodities desired by one or more agricultural commodity buyers and establishing a desired allocation of a amount of a type of agricultural commodity available to a user of the apparatus according to at least one allocation parameter, wherein at least one of the at least one allocation parameter reduces agricultural associated risks of the one or more agricultural commodity buyers;
    (g) in response to a command input into the system, displaying a listing of desired commodities including information related to the types, amounts or deliveries of the commodities;
    (h) receiving input data from a supplier of an agricultural commodity relating to a specific type and amount of a commodity which the supplier is willing to supply to the buyer at harvest or at other times;
    (i) comparing the input data from the supplier with current data from the buyer, including type, amount, and allocation parameter;
    (j) if input data exceeds amount of an allocation parameter for the supplier, requiring resubmission of at least some input data from the supplier for the supplier to continue;
    (k) if input data does not exceed the amount of the allocation parameter, generating a proposed contract for the sale of the specific type and amount of the commodity to be produced by the supplier for the buyer for review and consideration by buyer and supplier; and
    (l) dynamically and in substantially real time automatically decrementing the current quantity available for contracting each time a pending contract is issued.

36. A system for the formation of agricultural contracts for the future contracting of agricultural commodities over a wide area distributed network comprising:
    (a) a central computer system in operative communication with a wide area distributed network;
    (b) a plurality of widely distributed seller computers in operative communication with the wide area distributed network;
    (c) a plurality of widely distributed buyer computers in operative communication with the wide area distributed network;
    (d) a database stored on said central computer system containing data related to specific type and amount of a commodity which the seller is willing to commit to supplying to the buyer at harvest or after harvest, and types and amounts of agricultural commodities desired by one or more agricultural commodity buyers, and establishing a desired allocation of a quantity of a type of agricultural product available to a user of the system according to at least one allocation parameter, wherein the at least one allocation parameter is set to reduce agricultural associated risks of contracting for an agricultural commodity to be grown and delivered;
    (e) so that, in response to a command input into the system, buyers and sellers can form contracts related to the types, amounts or deliveries of the commodities by:
        (1) the central computer comparing input data from a seller with current data from the buyer related to type, quantity, and allocation parameter;
        (2) if the input data exceeds quantity of an allocation parameter, requiring resubmission of at least some input data from the seller for the seller to continue;
        (3) if input data does not exceed the quantity of the allocation parameter, generating a proposed agricultural production contract for review and consideration by buyer and seller;
    (f) dynamically and in substantially real time automatically decrementing the current quantity available for contracting each time a proposed contract is issued.

37. The system of claim 36 further comprising a software security component to restrict access to the system.

38. The system of claim 37 wherein the software security component comprises varying levels of access to data by authorized users of the system.

* * * * *